UNITED STATES PATENT OFFICE.

GEORGE S. BRACHER, OF NEW YORK, N. Y.

REED FOR HAT-SWEATS.

SPECIFICATION forming part of Letters Patent No. 296,919, dated April 15, 1884.

Application filed January 23, 1884. (No specimens.)

*To all whom it may concern:*

Be it known that I, GEORGE S. BRACHER, a citizen of the United States, and a resident of the city of New York, in the county and State of New York, have invented a new and useful Improvement in Reeds for Hat-Sweats, &c., of which the following is a specification.

My invention relates to reeds for use in the manufacture of hat-sweats and other purposes; and it consists in the treatment to which the reed as it is now sold in the market with hatters' supplies generally is subjected, and also in the resultant product as a new article of manufacture. These reeds as now found in the market have been prepared usually from rattan by splitting and rough-shaving usually into round rods of about one thirty-second of an inch in diameter. In that condition they have been generally used, and consequently in all fine work they had to be covered, particularly when placed in such exposed positions as on the edges of hat-sweats. I take the reeds in that rough condition and dye them to any desired color, then treat them with any ordinary wood-filling mixture to which, when greater flexibility of the reed is desired, I add a small percentage of glycerine. The reed is next passed through a polishing draw-plate, preferably heated, and when dry it receives a light finish of japan or other suitable varnish, or of oil, and when again dried the reed is ready for use.

A good filling mixture can be made of glue and whiting, or lamp-black, and should be used when quite warm. Other earthy matters may be substituted for the whiting, or used with it or with the lamp-black, and additional coloring-matters may be added to the mixture. The draw-plate forces part of the mixture between the fibers of the wood, and imparts to its surface a smooth hard finish, and the subsequent surface-dressing leaves this surface more or less lustrous, according to the characteristics of the liquid applied, the whole imparting to the reed all of the apparent firmness and fineness and beauty of appearance of the expensive finished and polished whalebone, for which it becomes an inexpensive substitute adapted to a variety of uses where beauty of finish as well as cheapness is an essential requisite. Hence, it will be apparent that my new reed can go into the market as a new article of manufacture with other supplies for hatters, milliners, and other consumers' uses.

I claim as new and desire to secure by Letters Patent—

1. As a new article of manufacture, a reed of rattan or analogous material impregnated with a filling material, and surface-hardened by compression and friction, all substantially as and for the purposes specified.

2. A method of treating reeds to improve their qualities and appearance for hat-sweat and other uses, consisting in coloring, filling, compressing, and surface-finishing, all substantially as set forth.

In testimony that I claim the foregoing as my invention I have signed my name, in presence of two witnesses, this 24th day of January, 1884.

GEORGE S. BRACHER.

Witnesses:
JOSEPH S. MICHAEL,
JOSEPH B. LYMAN.